USO11181943B2

(12) United States Patent
Ent et al.

(10) Patent No.: US 11,181,943 B2
(45) Date of Patent: Nov. 23, 2021

(54) ELECTRONIC DEVICE WITH SELF-ALIGNING ACCESSORY

(71) Applicant: Lenovo (Singapore) Pte. Ltd., New Tech Park (SG)

(72) Inventors: Ali Kathryn Ent, Garner, NC (US); Cuong Huy Truong, Cary, NC (US); Brian William Wallace, Wake Forest, NC (US); Thomas Perelli, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 257 days.

(21) Appl. No.: 14/971,596

(22) Filed: Dec. 16, 2015

(65) Prior Publication Data

US 2017/0177039 A1 Jun. 22, 2017

(51) Int. Cl.
  *G06F 1/16* (2006.01)
  *H04N 5/64* (2006.01)
  *H01F 7/02* (2006.01)

(52) U.S. Cl.
  CPC .......... *G06F 1/1626* (2013.01); *G06F 1/1669* (2013.01); *H01F 7/0252* (2013.01); *H04N 5/64* (2013.01); *H04N 5/642* (2013.01)

(58) Field of Classification Search
  CPC ... H01R 13/6205; G06F 1/182; H01F 7/0263; H04N 5/44; H04N 5/38; H04N 21/43632
  See application file for complete search history.

(56) References Cited

U.S. PATENT DOCUMENTS

| | | | |
|---|---|---|---|
| 7,239,800 B2 * | 7/2007 | Bilbrey | H04N 5/76 386/248 |
| 2007/0072442 A1 * | 3/2007 | DiFonzo | H01R 13/641 439/39 |
| 2007/0072443 A1 * | 3/2007 | Rohrbach | H01R 13/6205 439/39 |
| 2008/0070500 A1 * | 3/2008 | Rapp | H04N 5/2251 455/41.1 |
| 2012/0177322 A1 * | 7/2012 | Schwandt | G02B 6/4292 385/53 |
| 2013/0108064 A1 * | 5/2013 | Kocalar | G01R 31/318572 381/58 |
| 2013/0111521 A1 * | 5/2013 | Klarke | H04N 21/4221 725/38 |
| 2014/0098491 A1 * | 4/2014 | Wang | G06F 1/1626 361/679.56 |
| 2017/0062999 A1 * | 3/2017 | Thiers | H04M 1/0274 |

* cited by examiner

*Primary Examiner* — Michael E Teitelbaum
(74) *Attorney, Agent, or Firm* — Dean D. Small; The Small Patent Law Group LLC (57) ABSTRACT

An electronic assembly is provided comprising an electronic device and a self-aligning electronic accessory. The device includes a housing, a device connector and one or more processors to manage operation of the electronic device. The housing includes a device mating face that includes a device alignment feature. The self-aligning electronic accessory includes a body with electronic components and an accessory connector. The body includes an accessory mating face that includes an accessory alignment feature. The accessory alignment feature and accessory connector are spaced and dimensioned to align with the device alignment feature and device connector to physically join and communicatively couple the accessory and electronic device.

15 Claims, 8 Drawing Sheets

ELECTRONIC DEVICE WITH SELF-ALIGNING ACCESSORY

BACKGROUND

Embodiments of the present disclosure generally relate to electronic devices that have detachable electronic accessories.

Numerous types of electronic devices exist today, such as televisions, monitors, displays, personal computers, tablet devices, smart phones and the like. Modern electronic devices are connectable to various accessories through different types of connector ports, such as HDMI connectors, USB connectors DB-9 connectors and the like. For example, a television may be utilized with a sound bar or other electronic accessory where the sound bar is positioned adjacent to the television and connected electronically to the television through one or more cables. The sound bar may be physically mounted to the television, or alternatively may remain separate from the television, but for the cable connection there between.

Existing solutions for connecting electronic accessories to electronic devices, generally utilize one or more mechanical latching mechanisms having plastic features that are pushed through holes provided in a housing of the television or other electronic device. The electrical connection between the accessory and the television/device is provided with a separate cable connected to the accessory. For example, a cable may be provided that includes an HDMI connector, a USB connector, RCA jacks, a DB-9 connectors and the like. In some systems, an additional mechanical latching mechanism is positioned proximate to the electrical connector. For example, a cable may have a DB-9 connector on the end with one or more screws positioned on opposite sides of the DB-9 connector. A corresponding DB-9 receptacle is provided in the housing of the television, with threaded openings provided on opposite sides of the DB-9 receptacle to receive the DB-9 connector and screws. Optionally, the mechanical latching mechanism may utilize plastic features that are inserted into mating openings, where the plastic features of the latch mechanism are positioned adjacent to the electrical connector.

However, conventional solutions connecting accessories to electronic devices have certain limitations. For example, in order to attach the accessory, the user must first align the electrical and mechanical latching features on the accessory with corresponding features on the electronic device and separately join the electrical connector on the cable. In many instances, the mechanical and/or electrical connection on the electronic device may be located on the side or back of the device and be difficult to access or readily view, such as in connection with aligning pins or orienting a plug connector.

A need remains for improved mechanisms for connecting electronic accessories and electronic devices.

SUMMARY

In accordance with embodiments herein an electronic assembly is provided comprising an electronic device having a housing and one or more processors to manage operation of the electronic device. The one or more processors provided within the housing include a device alignment feature and device connector. A self-aligning electronic accessory is provided including a body with electronic components. The body includes an accessory alignment feature and accessory connector. The accessory alignment feature and accessory connector are spaced and dimensioned to align with the device alignment feature and device connector to physically join and communicatively couple the accessory and electronic device.

Optionally, the body and housing include assembly and device magnetic elements that become magnetically coupled with one another when positioned proximate to one another. The assembly and device magnetic elements pulling the body of the electronic accessory to a select self-alignment position with respect to the housing of the electronic device. The assembly and device magnetic elements include magnets that are located proximate to mating faces of the body and housing. The accessory alignment feature includes a standoff that projects from a mating face provided on the body. The device alignment feature may include a cavity within a mating face on the housing. The standoff may be sized and dimensioned to fit the cavity in connection with a selected self-alignment.

The accessory and housing alignment features includes magnets. The magnets may be oriented to have opposite polarities relative to one another to facilitate magnetic coupling there between. The accessory connector is located within the accessory alignment feature. The device connector is located within the device alignment feature to facilitate alignment of the accessory and device connectors. The body of the electronic accessory is directly mounted to an edge of the housing proximate to a top, bottom or side of the housing.

The electronic device may comprise a display presenting video content received by the electronic accessory through the accessory and device connectors. The electronic accessory may include a wireless transceiver that receives streaming video, a processor, and local storage storing program instructions to direct the processor to manage transfer of the streaming video to the electronic device through the accessory and device connectors. The accessory connector includes a transmitter. The device connector includes a receiver. The transmitter and receiver may wirelessly convey content there between in connection with communication between the electronic accessory and electronic device.

In accordance with embodiments herein an electronic assembly is provided comprising an electronic device having a housing and one or more processors to manage operation of the electronic device. The one or more processors provided within the housing include a device connector and a device magnetic element. A self-aligning electronic accessory includes a body with electronic components. The body includes an accessory connector and accessory magnetic element. The accessory magnetic element and accessory connector are spaced and dimensioned to align with the device magnetic element and device connector to physically join and communicatively couple the accessory and electronic device. The accessory and device magnetic elements become magnetically coupled with one another and pulling the body of the electronic accessory to a select self-alignment position with respect to the housing of the electronic device.

Optionally, the body and housing may include an accessory alignment feature and a device alignment feature, respectively. The accessory and device alignment features may be positioned relative to the accessory and device magnetic elements to align and physically join with one another when in the select self-alignment position.

In accordance with embodiments herein an electronic assembly with an electronic device is provided comprising providing an electronic device having a housing and one or more processors to manage operation of the electronic device. The one or more processors are provided within the housing. The housing includes a device alignment feature and device connector. The electronic assembly provides a self-aligning electronic accessory including a body with electronic components. The body includes an accessory alignment feature and accessory connector. The accessory alignment feature and accessory connector are spaced and dimensioned to align with the device alignment feature and device connector to physically join and communicatively couple the accessory and electronic device.

In accordance with embodiments herein a method is provided for self-aligning an electronic assembly with an electronic device comprising providing an electronic device having a housing and one or more processors to manage operation of the electronic device. The one or more processors are provided within the housing. The housing includes a device alignment feature and device connector and providing a self-aligning electronic accessory including a body with electronic components therein. The body includes an accessory alignment feature and accessory connector. The accessory alignment feature and accessory connector are spaced and dimensioned to align with the device alignment feature and device connector to physically join and communicatively couple the accessory and electronic device.

Optionally, the method further comprises utilizing magnetic coupling forces between assembly and device magnetic elements provided on the body and housing, respectively, to pull the body of the electronic accessory to a select self-alignment position with respect to the housing of the electronic device. The method further comprises locating magnets, as the assembly and device magnetic elements, proximate to mating faces of the body and housing. The method may size and dimension a standoff on a mating face of the body to fit a cavity within a mating face provide on the housing in connection with self-alignment.

Optionally, the method may facilitate the magnetic coupling by orienting magnets within the accessory alignment feature and housing alignment feature to have opposite polarities relative to one another. The method further comprises locating the accessory connector within the accessory alignment feature and the device connector within the device alignment feature. The method may receive video content at the electronic accessory and conveying the video content from the electronic accessory to the electronic device. The method may receive streaming video at the electronic accessory and managing transfer of the streaming video to the electronic device.

DETAILED DESCRIPTION

It will be readily understood that the components of the embodiments as generally described and illustrated in the FIGS. herein, may be arranged and designed in a wide variety of different configurations in addition to the described example embodiments. Thus, the following more detailed description of the example embodiments, as represented in the FIGS., is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1A:
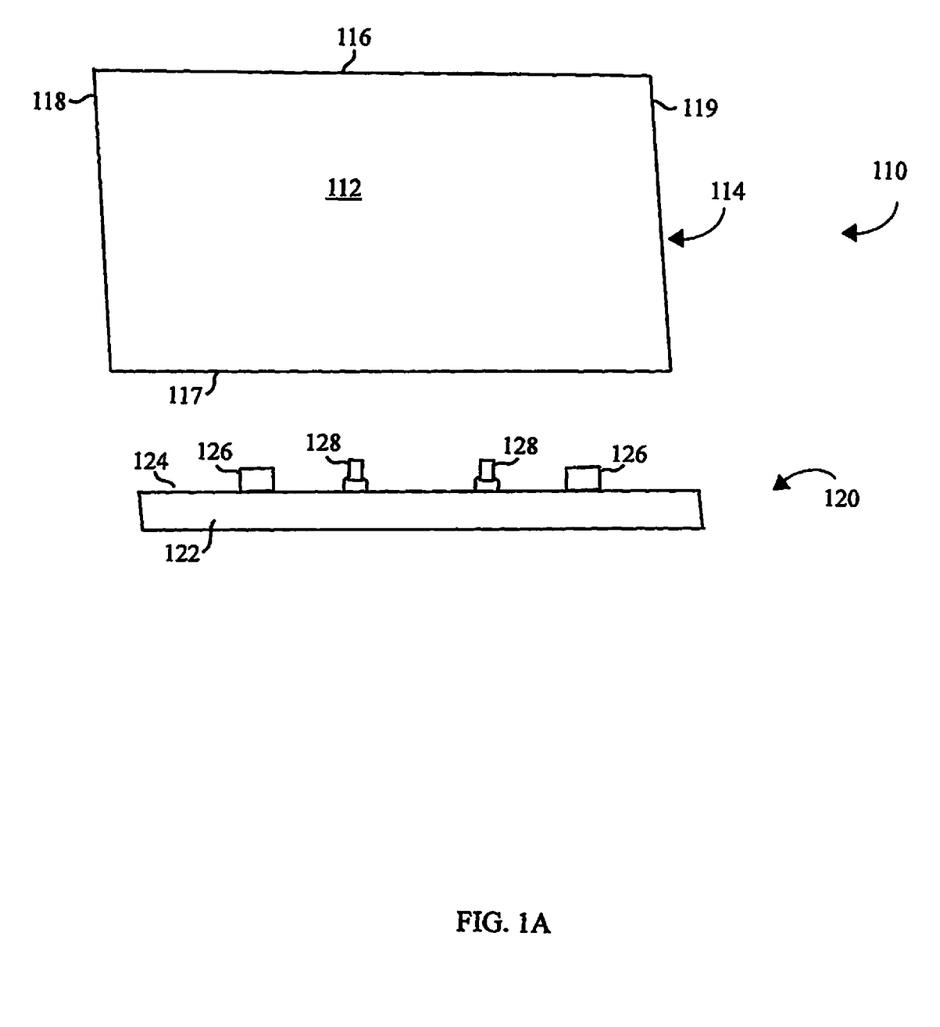
FIG. 1A illustrates an assembly provided in accordance with an embodiment herein.

FIG. 1A illustrates a system provided in accordance with an embodiment herein. The system includes an electronic device 110 and an electronic accessory 120. The electronic device 110 has a display 114 that includes a housing 112 having peripheral edges, namely an upper edge 116, a lower edge 117 and side edges 118, 119. In the present example, the electronic device generally relates to a display type device, such as a television, a computer monitor, or another type of electronic visual display. Optionally, the electronic device may correspond to other types of products, such as a keyboard, a laptop or desktop computer, a tablet device, a smart phone and the like.

The electronic accessory 120 includes a body 122 that encloses electronic components examples of which are described below in more detail. In the example of FIG. 1A, the body 122 is formed as an elongated structure that is shaped to fit along an edge of an electronic device 110. The body 122 includes a mating face 124 extending along at least one side or edge thereof. The mating face 124 is shaped and dimensioned to abut against and form a physical connection with a corresponding edge 117 on the housing 112 of the display 114. In the example of FIG. 1A, the lower edge 117 includes the mating face on the housing 112 to which the mating face 124 is physically connected. Optionally, the electronic accessory 120 may be attached to different regions of the display 114, such as along the upper edge 116, either side edge 118, 119, the rear surface, the bezel area along the front surface and the like.

One or more accessory connectors 128 are provided on, and extend outward from, the mating face 124. As explained herein, the accessory connectors 128 electrically and communicatively couple electronic components within the electronic accessory 120 and electronic components within the display 114. The electrical and communicative coupling may be through a physical interconnection and/or a wireless interconnection.

The body 122 includes one or more accessory alignment features 126 provided on, and extending outward from, the mating face 124. The accessory alignment features 126 are spaced and dimensioned relative to one another and along the mating face 124 in a desired manner to align with corresponding housing alignment features 170 on the housing 112 in order to mount the electronic accessory 120 to the housing 112. The accessory alignment features 126 facilitate alignment when a user is attaching the electronic accessory 120 to a corresponding edge of the display 114.

The electronic accessory 120 and electronic device 110 include assembly and device magnetic elements 134 and 178, respectively that magnetically couple with one another when proximate to one another. The assembly and device magnetic elements 134 and 178 pull the body 122 of the electronic accessory 120 to a select self-alignment position with respect to the housing 112 of the electronic device 110. For example, the assembly and device magnetic elements 134 and 178 include magnets that are located proximate to mating faces of the body 122 and housing 112. The magnets are oriented to have opposite polarities relative to one another to facilitate magnetic coupling there between.

In accordance with embodiments, the magnetic coupling between the assembly and device magnetic elements 134 and 178 draws or pulls the body 122 of the electronic accessory 120 to the select self-alignment position which at least partially aligns the assembly and device alignment features 126 and 170 (FIG. 3) with one another. As the electronic accessory 120 and electronic device 110 are further advanced toward one another, the alignment features 126 and 170 complete the self-alignment operation.

Figure 1B:
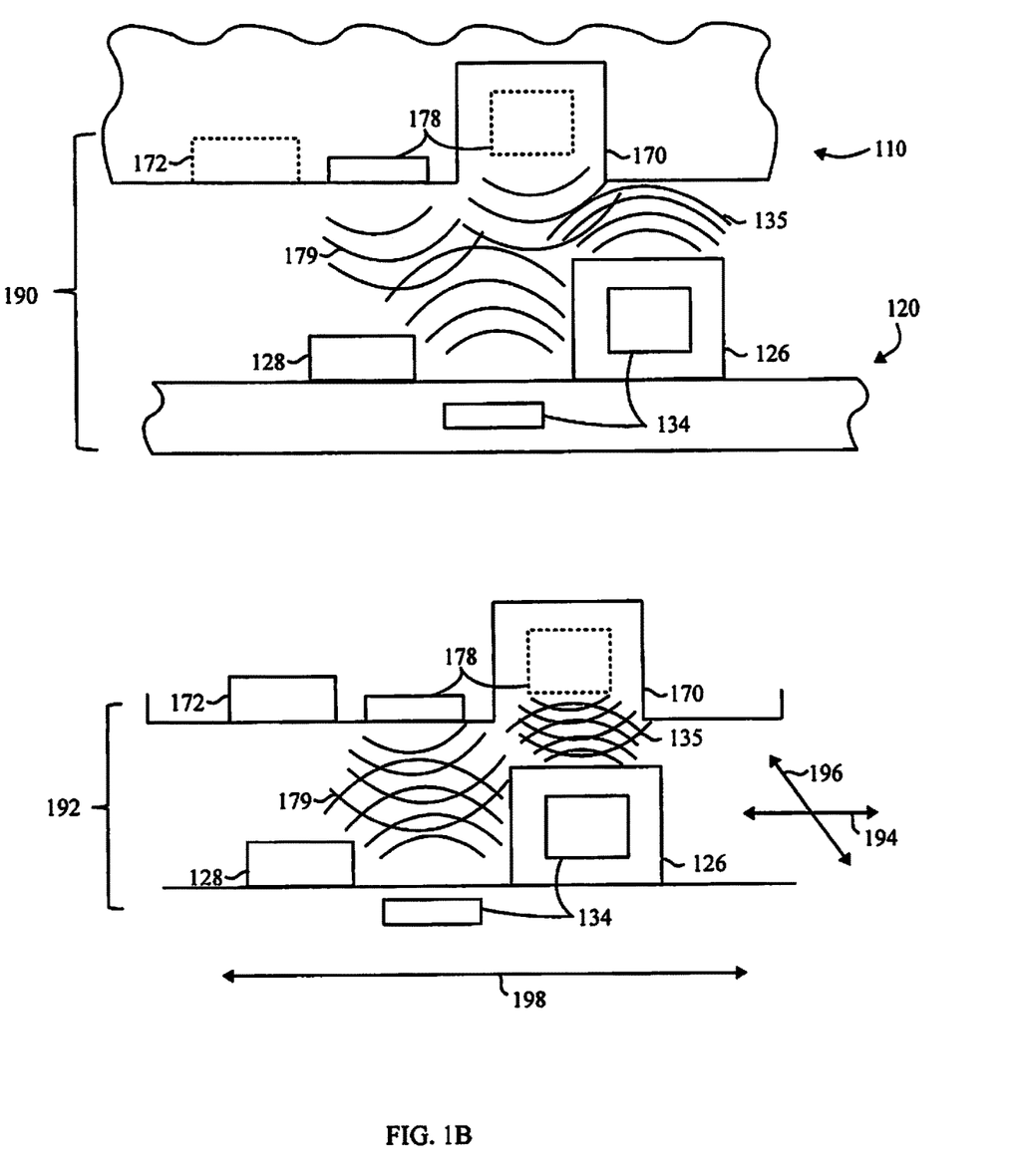
FIG. 1B illustrates a self-alignment process for the assembly of FIG. 1A implemented in accordance with embodiments herein.

FIG. 1B illustrates the self-alignment process in accordance with embodiments herein as carried out while mounting the electronic accessory 120 to the electronic device 110. FIG. 1B illustrates portions of the electronic accessory 120 and the electronic device 110 while in an initial remote loading position 190. The electronic assembly 120 includes an accessory alignment feature 126, and accessory connector 128 and accessory magnetic elements 134. The electronic device 110 includes a device alignment feature 170, and device connector 172 and device magnetic elements 178.

When in the initial remote loading position 190, the accessory and device magnetic elements 134 and 178 are remote from one another, but sufficiently close to experience weak magnetic coupling forces 135, 179 (as denoted by the magnetic field lines). The weak magnetic coupling forces 135, 179 introduces a light pull or draw toward one another and in a particular direction. The distance between the electronic accessory and device 120 and 110, at which the weak magnetic coupling forces 135, 179 is experienced will vary depending upon the strength, size, number and nature of the magnetic elements. By way of example, weak magnetic coupling forces 135, 179 may begin to be experienced when the magnetic elements 134, 179 are within 3 to 12 inches from one another, or more particularly 3-6 inches from one another. The magnetic coupling forces 135, 179 introduces a force that seeks to pull the magnetic elements 134, 178 in a particular alignment with one another that corresponds to a select self-alignment position. The select self-alignment position may represent a particular alignment, such as when the side edges of the accessory connector 128 and accessory alignment feature 126 alignment with corresponding edges of the device connector and alignment feature 172 and 170, respectively. Optionally, the self-alignment position may represent a range (e.g. a fraction of an inch, a few millimeters or centimeters, and the like).

As the electronic accessory 120 is further advanced toward the electronic device 110, an intermediate loading position 192 is reached (e.g. when the electronic accessory and device 120 and 110 are less than 3 inches from one another, or more particularly within one-3 inches). When in the intermediate loading position 192, the magnetic coupling forces 135, 179 is relatively strong and introduces a relatively strong force seeking to pull the electronic device and assembly 110 and 120 toward one another and into a predetermined select self-alignment.

Figure 3:
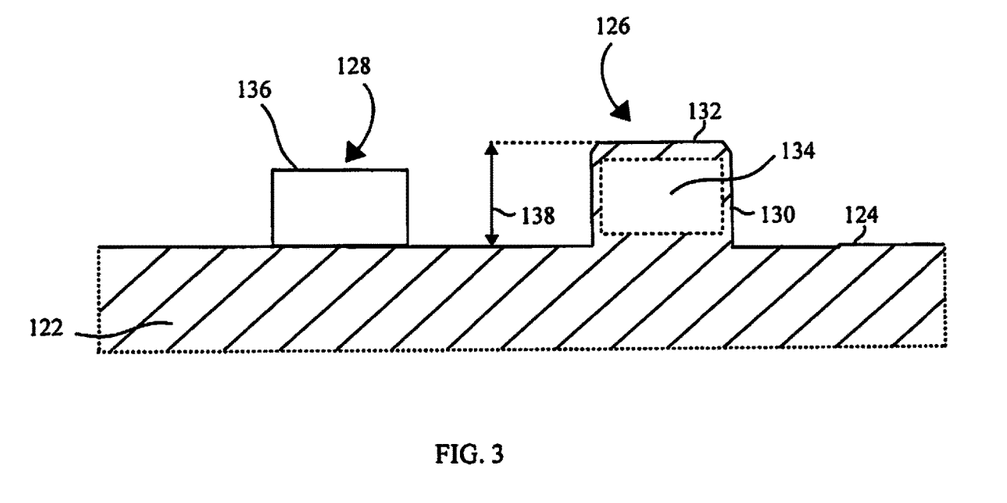
FIG. 3 illustrates a front cross sectional view of a portion of the body in a region proximate to an alignment feature and accessory connector in accordance with embodiments herein.

The predetermined select self-alignment may be defined in a longitudinal direction 194 and a lateral direction 196. The longitudinal and lateral directions 194 and 196 are defined relative to the mating faces 124 and 168 (FIG. Three) on the electronic accessory and device 120 and 110, respectively. In the example of FIG. 1A, the mating face 124 on the electronic accessory 120 represents an elongated surface extending along a longitudinal axis 198. The longitudinal direction 194 corresponds to the longitudinal axis 198 along which the mating face 124 extends. The mating face 124 includes a thickness or width extending in a lateral direction. By way of example, the thickness of the mating face 124 may generally correspond to a thickness of the edge of the electronic device 110. The lateral direction 196 corresponds to the lateral axis of the mating face 124.

When in the intermediate loading position 192, the magnetic coupling forces 135, 179 pull or draw the electronic accessory 120 along the longitudinal and lateral directions 194 and 196 to the selected self-alignment position until the connectors when 128, 172 and alignment features 126, 170 substantially aligned with one another. The magnetic coupling forces 135, 179 continue to grow stronger and exert increased pull or draw to facilitate the self-alignment until the alignment features 126, 170 physically engage one another. Once the alignment features 126 and 170 physically engage one another, these features facilitate completion of the self-alignment process until in a fully engaged/loaded position.

Figure 2:
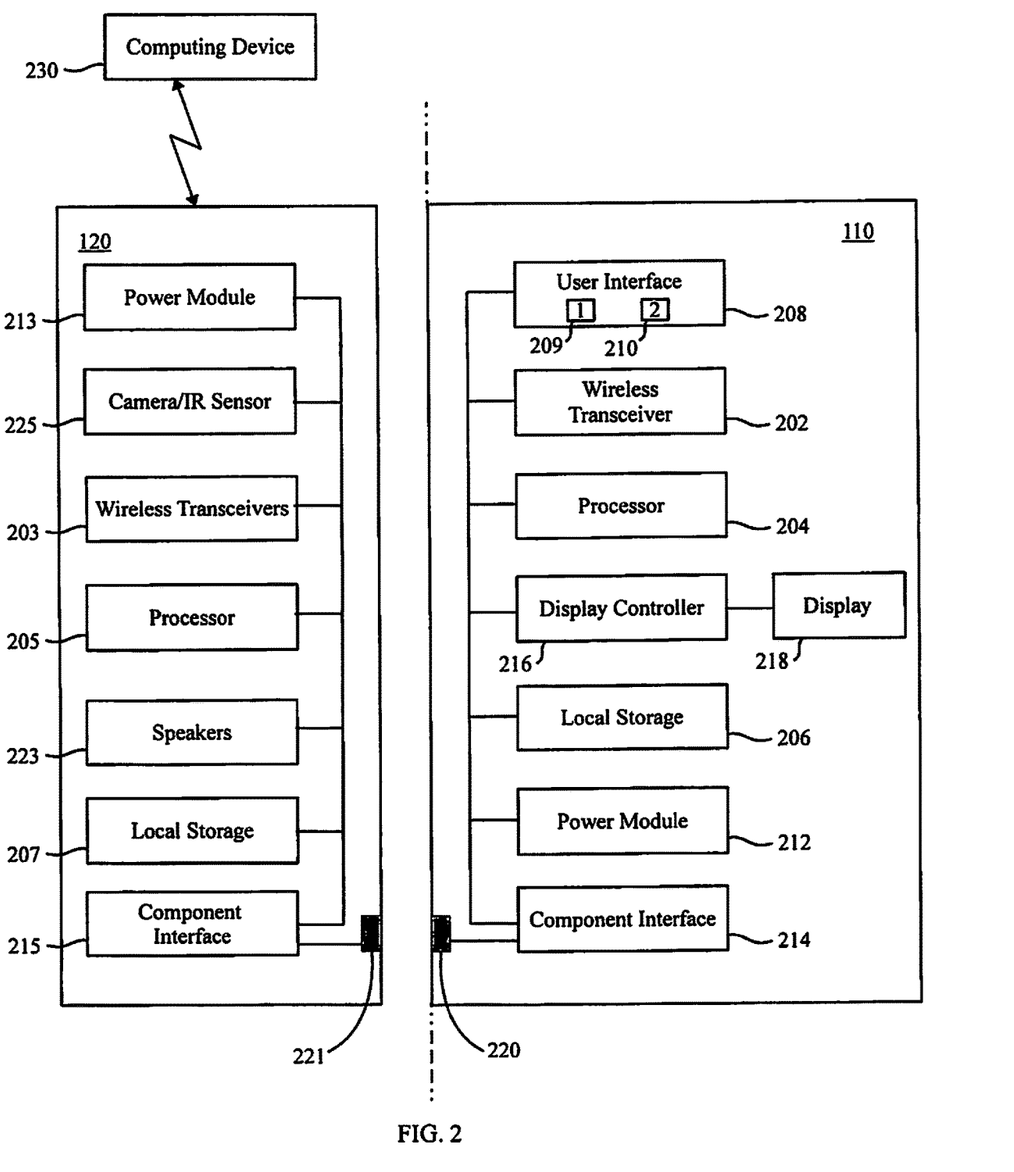
FIG. 2 illustrates a simplified block diagram of the electronic components in the electronic accessory and in the electronic device in accordance with embodiments herein.

FIG. 2 illustrates a simplified block diagram of the electronic components in the electronic accessory 120 and in the electronic device 110. The electronic device 110 includes components such as one or more wireless transceivers 202, one or more processors 204 (e.g., a microprocessor, microcomputer, application-specific integrated circuit, etc.), one or more local storage (also referred to as a memory portion) 206, a user interface 208 which includes one or more input devices 209 and one or more output devices 210, a power module 212, and a component interface 214. The processors 204 represent a control circuit that manages at least a portion of the operations of the electronic device 110. All of these components can be operatively coupled to one another, and can be in communication with one another, by way of one or more internal communication links, such as an internal bus. In the example of FIG. 2, the electronic device 110 also includes a display controller 216 that controls a display 218 (corresponding to display 114 in FIG. 1A). A component interface 214 is electrically coupled to one or more device connectors 220 that are provided at a mating interface with the electronic accessory 120.

The electronic accessory 120 may include all or a portion of similar components such as one or more wireless transceivers 203, one or more processors 205 (e.g., a microprocessor, microcomputer, application-specific integrated circuit, etc.), one or more local storage (also referred to as a memory portion) 207, a power module 213, and a component interface 215. The component interface 215 is electrically coupled to one or more connectors 221 provided at the mating interface. The electronic accessory 120 also includes speakers 223 and a camera or infrared sensor 225. All of these components can be operatively coupled to one another, and can be in communication with one another, by way of one or more internal communication links, such as an internal bus.

The input and output devices 209, 210 may each include a variety of visual, audio, and/or mechanical devices. For example, the input devices 209 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 210 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 210 may include a touch sensitive screen, a non-touch sensitive screen, a text-only display, a smart phone display, an audio output (e.g., a speaker or headphone jack), and/or any combination thereof.

The local storage 206, 207 can encompass one or more memory devices of any of a variety of forms (e.g., read only memory, random access memory, static random access memory, dynamic random access memory, etc.) and can be used by the processors 204, 205 to store and retrieve data. The data that is stored by the local storage 206, 207 can include, but need not be limited to, operating systems, applications, user collected content and informational data. Each operating system includes executable code that controls basic functions of the communication device, such as interaction among the various components, communication with external devices via the wireless transceivers 202, 203 and/or the component interfaces 214, 215 and storage and retrieval of applications and data to and from the local storage 206, 207. Each application includes executable code that utilizes an operating system to provide more specific functionality for the communication devices, such as file system service and handling of protected and unprotected data stored in the local storage 206, 207.

The local storage 206, 207 stores content. The applications stored in the local storage 206, 207 facilitate the management of content, identifiers, and operation of the electronic device 110 and accessory 120. Other applications stored in the local storage 206, 207 include various application program interfaces (APIs), some of which provide links to/from a cloud hosting service. The power module 212 may include a power supply, such as a battery, for providing power to the other components when desirable to enable the device 110 to be portable, as well as circuitry providing for the battery to be recharged. The component interface 214 provides a direct connection to other devices, auxiliary components, or accessories for additional or enhanced functionality, and in particular, can include a USB port for linking to a user device with a USB cable. The component interfaces 214, 215 provide wired or wireless communications between the device 110 and accessory 120.

Each transceiver 202, 203 can utilize a known wireless technology for communication. Exemplary operation of the wireless transceivers 202, 203 may take a variety of forms and may include, for example, operation in which, upon reception of wireless signals, the components of device 110 detect communication signals and the transceivers 202, 203 demodulates the communication signals to recover incoming information, such as voice and/or data, transmitted by the wireless signals.

The electronic components within the accessory 120 may vary. By way of example, the accessory 120 may include electronic components that support WIGIG communication, WIDI communication, as well as other numerous local area network protocols. The accessory 120 may include one or more wireless transceivers to support wireless near field communication, such as with Bluetooth, Wi-Fi, Bluetooth low energy, as well as other numerous conventional wireless communications protocols. For example, a wireless communications protocols (e.g., WIGIG) may be utilized to achieve fast data transfer rates, such as when affording a wireless docking function for a laptop or other computing device with peripherals including, but not limited to an external display. The wireless communications protocol may be utilized to transfer high quality video (e.g. high definition video), such as when streaming content from a computing device 230 to a television, monitor or other display.

Optionally, the local storage 207 or processor 205 may be added to expand the storage capability of the local storage 206 and/or to expand the processing capabilities of the processor 204. Optionally, the electronic components may provide the functionality of a PC stick or a port replicator. Optionally, the electronic components may include a 3-D camera (camera 225) to enable related functionality, such as gesture detection, 3-D scanning and the like. The accessory 120 may include a battery to provide added batty driven life to the main electronic device 110. The accessory 120 may also include a display. For example, the accessory 120 may provide a secondary display when connected to an electronic device having a primary display. Optionally, the accessory 120 may provide a primary display when the electronic device does not include a display (or a large enough display), such as when the electronic device 110 represents a keyboard, tablet device, smart phone and the like. Optionally, the accessory 120 may include "upgraded" speakers (relative to speakers in the electronic device 110) to provide better sound quality than speakers integrated into the primary electronic device 110.

One example application may relate to streaming video and/or audio content from a computing device 230. With reference to FIG. 1A, one or more separate computing devices 230 may communicate with the electronic accessory 110, such as by streaming audio/video or other content from the computing device 230, through the wireless transceiver 203, to the electronic accessory 120. The processor 205 may then reformat or otherwise manipulate the incoming streaming content and pass the streaming content through a physical electrical connection (e.g. through contacts 221 and 220)

to the processor 204 of the electronic device 110. The processor 204 may then pass the incoming streaming content to the display controller 216 and/or to the local storage 206. The incoming streaming content is subsequently presented on the electronic device, such as displayed on the display 218. Optionally, speakers 223 may play audio content received from the computing device 230 without being routed to the electronic device 110, and/or upon receiving audio signals from the electronic device 110.

FIG. 3 illustrates a front cross sectional view of a portion of the body 122 in a region proximate to an alignment feature 126 and accessory connector 128. The alignment feature 126 is formed as a standoff 130 that projects outward from the mating face 124 on the body 122. In the example of FIG. 3, the standoff 130 includes a lead in chamfer 132 to facilitate alignment with a mating feature on the housing 112 (FIG. 1A).

A magnetic element 134 is located within the standoff 130 and is positioned to be attracted to a corresponding mating magnet (e.g. magnetic element 178 in FIG. 4) sleep. The magnetic elements 134, 178 provided within the electronic accessory 120 and electronic device 110 facilitate alignment while the electronic accessory 120 is being assembled with the electronic device 110. For example, as electronic accessory 120 is moved closer to a mating face of the electronic device 110, the magnetic fields of the magnetic elements 134, 178 become coupled with one another and draw/pull the electronic accessory 120 to a position at which the magnets directly aligned with one another. The closer the electronic accessory 120 and electronic device 110 move, the stronger the magnetic coupling between the magnetic elements 134 and 178. The magnetic coupling causes the magnetic elements 134 and 178 to attempt to align with one another in a specific manner. As the magnetic elements 134, 178 attempt to align in the particular manner, the magnetic elements 134, 178 pull the body of the electronic accessory to a similar corresponding specific alignment with respect to the housing of the electronic device.

The accessory connector 128 projects outward from the mating face 124 in a common direction as the standoff 130. The accessory connector 128 is spaced a desired distance from the standoff 130. The accessory connector 128 has an outer surface 136 that projects a height/distance from the mating face 124 that is less than a height (as denoted at 138) of the standoff 130. For example, the connector 128 may be shorter than the standoff 132 to afford additional protection against physical damage when the accessory 120 is handled independent of the electronic device 110. While a single alignment feature 126 and accessory connector 128 are illustrated, it is recognized that one or more such features may be provided along the body 122. The spacing between the alignment feature 126 and accessory connector 128 may be varied and/or the number of alignment features 126 may differ from the number of accessory connectors 128.

Figure 4:
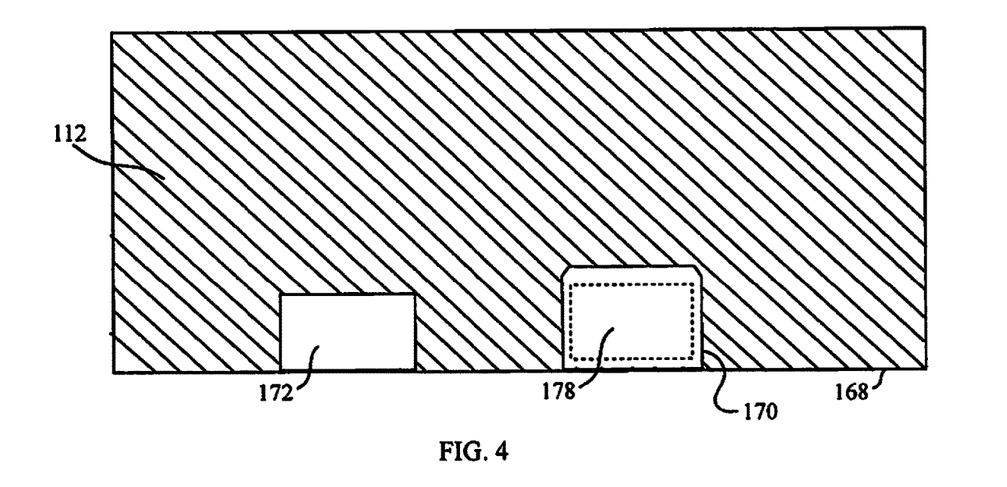
FIG. 4 illustrates a front cross sectional view of the portion of the housing of the display in a region proximate to a device alignment feature and a device connector in accordance with embodiments herein.

FIG. 4 illustrates a front cross sectional view of the portion of the housing 112 of the display 114 in a region proximate to a device alignment feature 170 and a device connector 172. The device alignment feature 170 and the device connector 172 are provided along a mating face 168 of the housing 112. The device alignment feature 170 represents a cavity. The device alignment feature 170 has a shape, width and depth that are dimensioned to correspond to, and receive, the standoff 130 (FIG. 3). A magnetic element 178 is provided within the body of the housing 112 immediately adjacent to the device alignment feature 170. The magnetic elements 134 (FIGS. 3) and 178 are oriented to have polarities that attract one another, such that when the standoff 130 is securely received within the cavity of the device alignment feature 170, the magnetic elements 134 and 178 provide a coupling force with one another and resist separation. The device connector 172 represents a port that has a form factor that corresponds to the accessory connector 128. For example, the port of the device connector 172 may represent a female HDMI receptacle, USB receptacle, DB-9 receptacle and the like.

Figure 5:
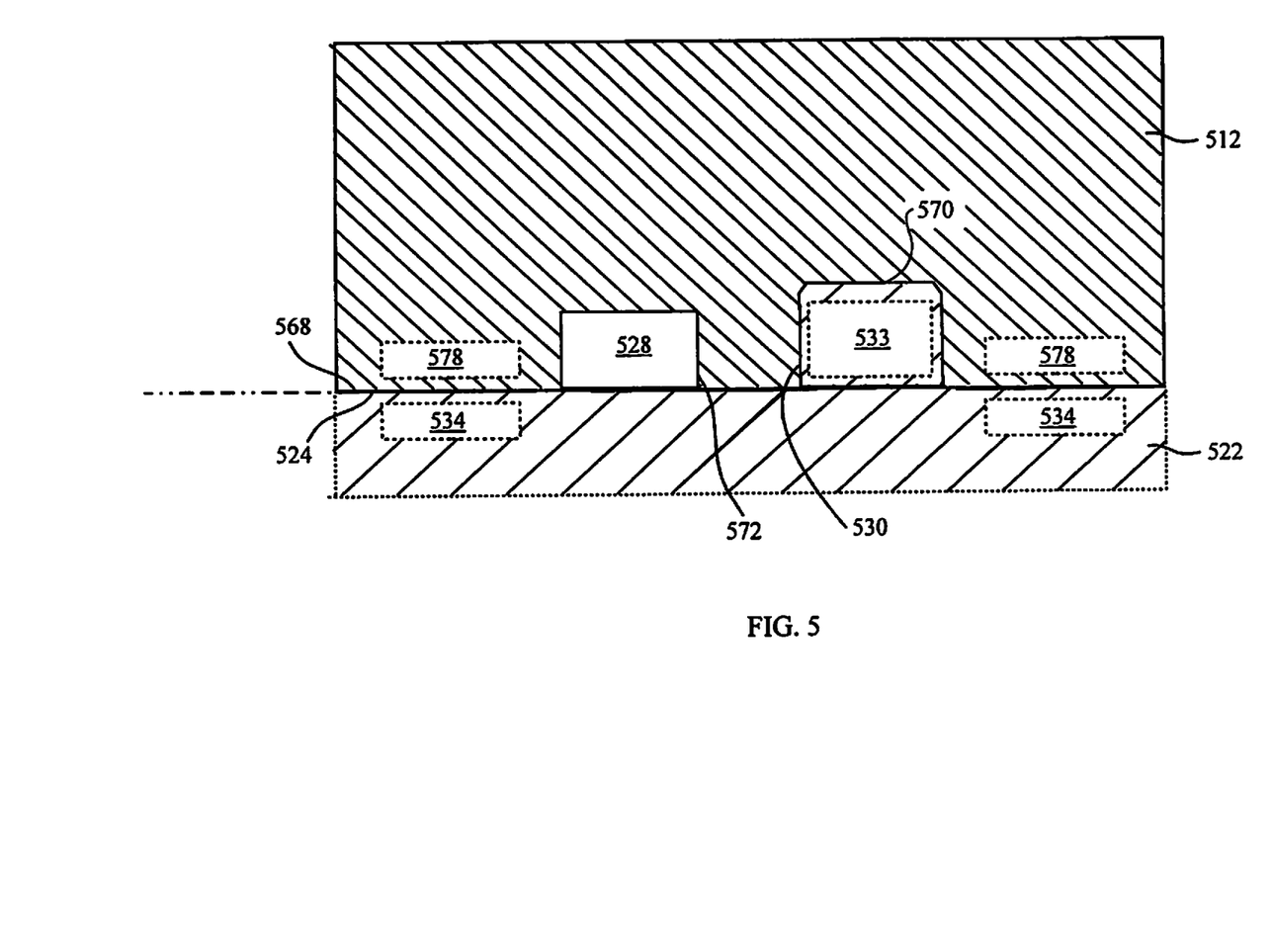
FIG. 5 illustrates a front cross-sectional view of a portion of an electronic accessory coupled to a housing of an electronic device in accordance with embodiments herein.

FIG. 5 illustrates a front cross-sectional view of a portion of an electronic accessory coupled to a housing of an electronic device. FIG. 5 illustrates a portion of a body 522 of an electronic accessory and a portion of a housing 512 of an electronic device. The body 522 and housing 512 mate with one another along mating faces 524 and 568. A standoff 530 is received within the cavity of a device alignment feature 570, and accessory connector 528 is mated with a device receptacle 572.

Magnets 534 are formed within the body 522 below the surface of the mating face 524. The magnets 534 are located in close proximity to the mating face 524. In the example of FIG. 5, the magnets 534 are elongated to offer a relatively large surface area that extends in close proximity to (e.g. parallel to) the mating face 524. Magnets 578 may be inserted in slots or formed (e.g., over molded) within the housing 512 and are located slightly below a surface of the mating face 568. The magnets 578 are located in close proximity to the mating face 568. The magnets 578 are elongated and oriented in a manner similar to the magnets 534 to offer a relatively large surface area to facilitate magnetic coupling with magnets 534. When the accessory is attached to the electronic device, the magnets 534 and 578 provide a retention force to maintain interconnection there between.

Optionally, the magnets 533 may be provided within the standoff 530 and adjacent to the cavity of the device alignment feature 572 coupled with one another to provide a retention force.

Figure 6A:
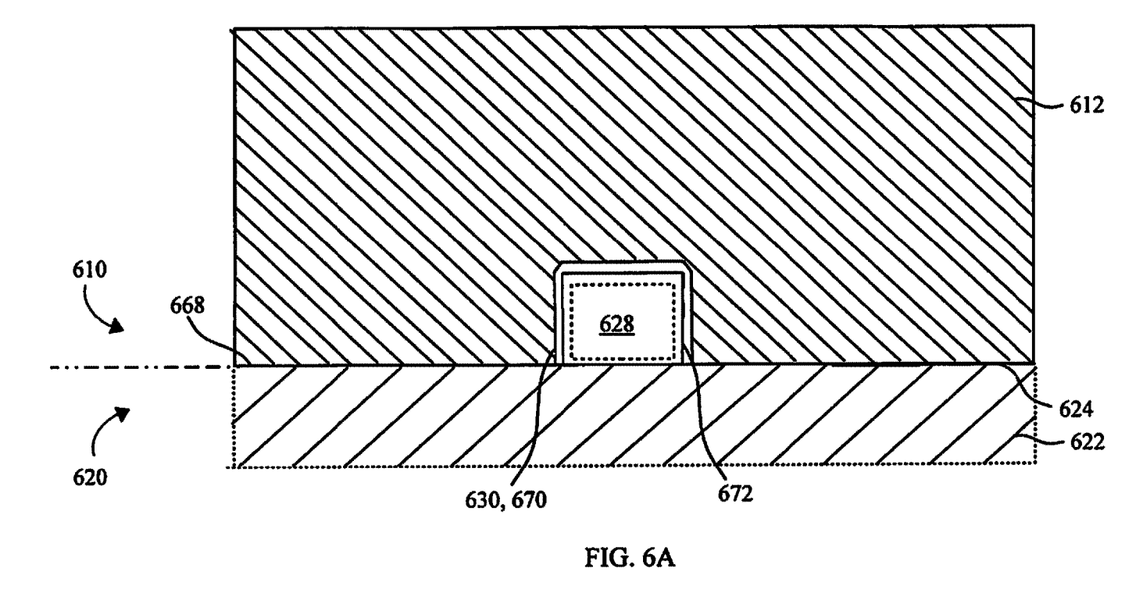
FIG. 6A illustrates an alignment and connector configuration formed in accordance with an alternative embodiment.
Figure 6B:
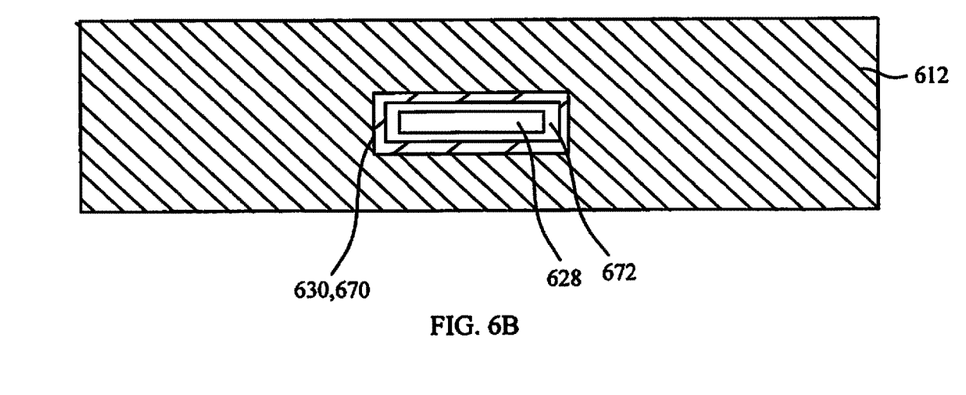
FIG. 6B illustrates an alignment and connector configuration formed in accordance with an alternative embodiment.

FIGS. 6A and 6B illustrate an alignment and connector configuration formed in accordance with an alternative embodiment. FIG. 6A illustrates a front cross-sectional view of a portion of the interconnection region between an accessory 620 and an electronic device 610. A portion of a body 622 for the accessory 620 is illustrated in cross-section, as is a portion of a housing 612 for the electronic device 610. The body 622 includes a standoff 630 that extends outward from a mating face 624 formed on the body 622. The standoff 630 is received in a cavity defining a device alignment feature 670 that is formed in the housing 612 and opens onto the mating face 668 of the housing 612.

The configuration of FIGS. 6A and 6B differs from the configuration of FIGS. 3 and 4, at least in part, by locating the accessory connector 628 within the standoff 630. A device connector 672 is provided within the device alignment feature 670. The accessory connector 628 and device connector 672 electrically coupled to one another when the standoff 630 is received in the cavity of the device alignment feature 670.

FIG. 6B illustrates a top plan cross-sectional view of the region illustrated in FIG. 6A. As illustrated in FIG. 6B, the standoff 670 may be generally rectangular in shape and configured to surround the accessory connector 628 and be received within the cavity in the housing 612 of the electronic device. While not illustrated, optionally, magnets may be provided along the mating faces 624 and 668 to facilitate physical connection of the accessory 620 and electronic device 610.

Figure 7:
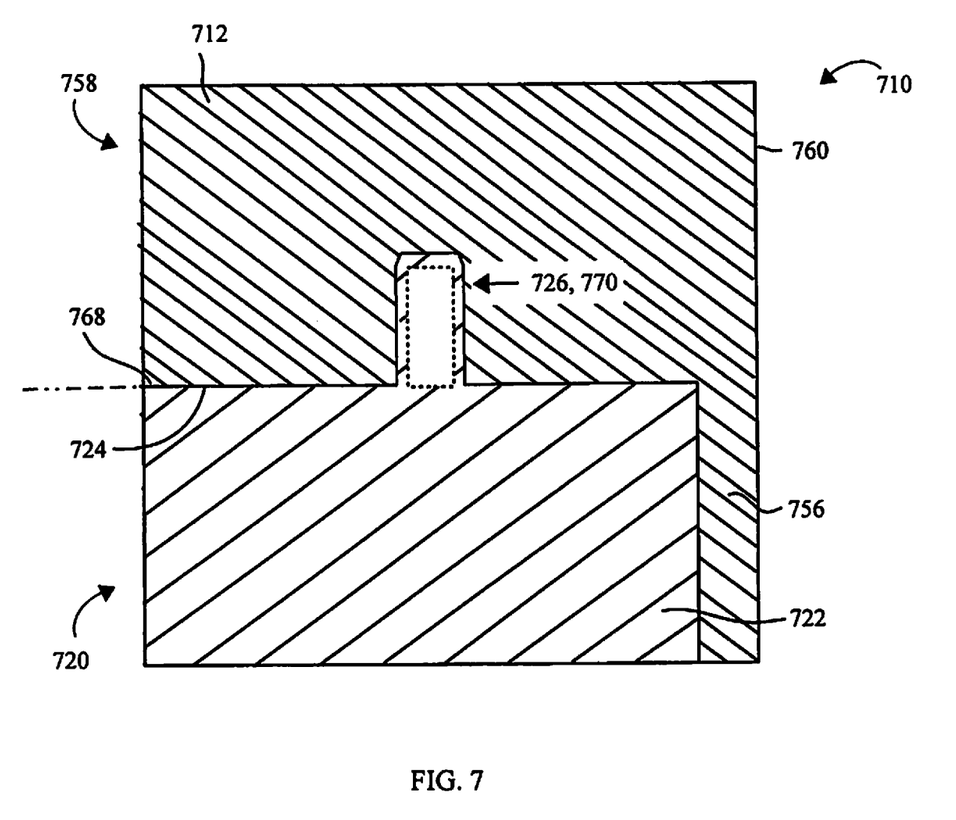
FIG. 7 illustrates a side cross-sectional view of a portion of the mating interface between an accessory and electronic device in accordance with embodiments herein.

FIG. 7 illustrates a side cross-sectional view of a portion of the mating interface between an accessory and electronic device. In FIG. 7, an accessory 720 is illustrated to have a body 722 that is formed with a generally rectangular cross-section. The body 722 has a mating face 724 that abuts against a housing 712 of the electronic device 710. The housing 712 includes a mating face 768 that abuts against the mating face 724 when the accessory and device alignment features 726, 770 mate with one another.

The housing 712 is formed with a back alignment wall 756 that projects outward from the mating face 768. In the example of FIG. 7, the electronic device 710 represents a display, such as a television or monitor. The display of the electronic device 710 has a front surface 758 and a back surface 760. The back alignment wall 756 extends outward from the mating face 768 in line with the back surface 760 to define a flange that facilitates alignment of the accessory 720 when attached.

Optionally, side alignment walls/flanges may be provided on one or both ends of the electronic device. With reference to FIG. 1A, the side flanges may project outward from the side edges 118 and 119 to facilitate alignment when attaching the accessory.

Optionally, magnets may be provided within the back alignment wall 756 (and/or side alignment walls/flanges). Corresponding magnets may then be located within the body 722 to be positioned proximate to any magnets provided within the back alignment wall 756 and/or side alignment walls/flanges.

Figure 8:
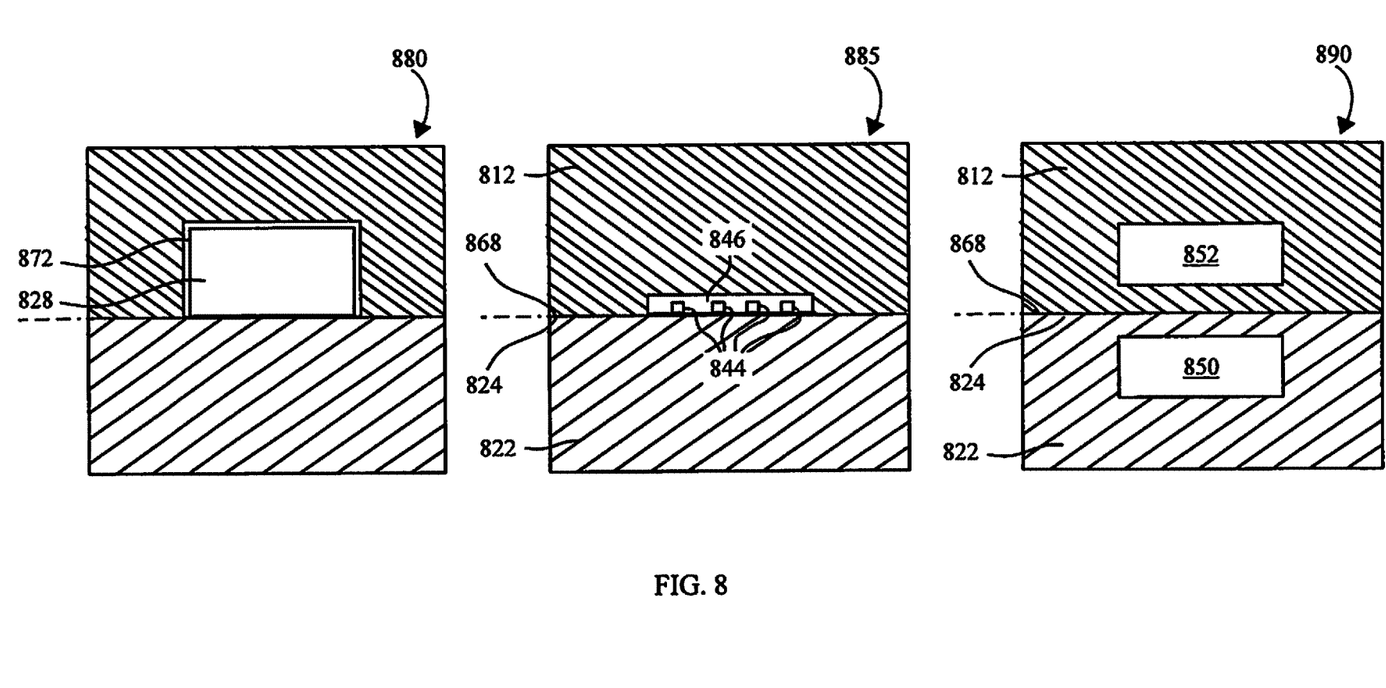
FIG. 8 illustrates examples of alternative electrical connection configurations to be used as accessory and device connectors in accordance with embodiments herein.

FIG. 8 illustrates examples of alternative electrical connection configurations to be used as accessory and device connectors. A connector configuration 880 includes a male connector provided as the accessory connector 828 and a female connector provided as the device receptacle 872. The connector 828 and receptacle 872 are electrically coupled to one another when the accessory is securely joined to the electronic device/display.

A connector configuration 885 includes one or more pins 844 provided on the mating face 824 of the body 822 of the accessory. Contact pads 846 are provided on the mating face 868 of the housing 812 of the electronic device. When the accessory is attached, the pins 844 engaged the pads 846 to form an electrical connection there between.

A connector configuration 890 includes a wireless RF interface. The accessory connector 890 includes a transmitter 850 that is housed within the body 822 of the accessory and positioned proximate to the mating face 824. A receiver 852 is located within the housing 812 of electronic device and positioned proximate to the mating face 868. The transmitter 850 and receiver 852 are positioned proximate to one another to facilitate wireless communication there between. Optionally, the transmitter 850 and receiver 852 may represent transceivers to support bidirectional communication between the accessory and electronic device.

Optionally, the magnets provided in accordance with various embodiments may range in size and the number of magnets provided in the electronic accessory an electronic device. For example, the size, dimensions and number of magnets may be varied based upon the force desired to be applied. For example, larger electronic accessories may warrant greater magnetic coupling forces, in which case the magnet size, dimensions and number of magnets may be increased. Alternatively, larger electronic accessories may warrant lesser magnetic coupling forces, in which case the size, dimensions a number of magnets may be decreased.

Optionally, the accessory and device alignment features may be varied. For example, in the foregoing embodiments, a standoff and cavity are described as one example. Alternatively, other structures may be utilized. For example, the standoffs and cavities may be shaped with circular, rectangular, triangular and other cross-sections. A combination of standoffs and cavities may be provided upon the accessory, while a corresponding mating combination of cavities and standoffs are provided on the electronic device. Combinations other than standoffs and cavities may be utilized. For example, the accessory and device alignment features may be formed as a series of waves, zigzag pattern, ribs or other contoured shapes that match with one another.

Optionally, magnets may be provided in only one of the electronic assembly and the electronic device, while a metallic item is provided on the opposite one of the electronic assembly and electronic device. The magnets are attracted to the metallic item in the same manner as described above when magnets made with one another.

The physical connection between the electronic accessory and the electronic device may be maintained or supplemented through the use of various latching devices, in addition to magnets. Examples of other latching devices represent Velcro, section, elastic bands and the like. The latching devices may be utilized in addition to the magnets, wherein the magnets facilitate alignment, while the latch is utilized to strengthen the interconnection between the accessory and device.

It should be clearly understood that the various arrangements and processes broadly described and illustrated with respect to the FIGS., and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Aspects are described herein with reference to the FIGS., which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic assembly, comprising:
an electronic device having a housing and one or more processors to manage operation of the electronic device, the one or more processors provided within the housing, the housing including a device alignment feature and device connector; and
a self-aligning electronic accessory including a body that houses one or more of a processor, wireless transceiver, local storage, speakers, camera and infrared sensor, the body including an accessory alignment feature and accessory connector, the accessory alignment feature and accessory connector spaced and dimensioned apart from each other to align with the respective device alignment feature and device connector, the self-aligning electronic accessory directly mounted onto the electronic device, wherein the accessory alignment feature projects outward from a mating face of the body by a distance greater than the accessory connector to facilitate self-alignment between the electronic device and accessory.

2. The electronic assembly of claim 1, wherein the body and housing include accessory and device magnetic elements that magnetically couple with one another when proximate to one another, the accessory and device magnetic elements pulling the body of the electronic accessory to a select self-alignment position with respect to the housing of the electronic device.

3. The electronic assembly of claim 2, wherein the accessory and device magnetic elements include magnets that are located proximate to mating faces of the body and housing.

4. The electronic assembly of claim 1, wherein the body of the electronic accessory is elongated and includes a mating face to directly mount onto the housing, the accessory alignment feature includes a standoff that projects outward from the mating face by a height greater than a height of an outer surface of the accessory connector, the device alignment feature including a cavity within a mating face provide on the housing, the standoff sized and dimensioned to fit the cavity in connection with self-alignment.

5. The electronic assembly of claim 1, wherein the accessory connector is located within the accessory alignment feature and the device connector is located within the device alignment feature.

6. An electronic assembly, comprising:
an electronic device having a housing and one or more processors to manage operation of the electronic device, the one or more processors provided within the housing, the housing including a device alignment feature and device connector; and
a self-aligning electronic accessory including a body that houses one or more of a processor, wireless transceiver, local storage, speakers, camera and infrared sensor, the body including an accessory alignment feature and accessory connector, the accessory alignment feature and accessory connector spaced and dimensioned apart from each other to align with the respective device alignment feature and device connector, the self-aligning electronic accessory directly mounted onto the electronic device,
wherein the body of the electronic accessory is elongated and includes a mating face to directly mount onto the housing, the accessory alignment feature includes a standoff that projects outward from the mating face by a height greater than a height of an outer surface of the accessory connector, the device alignment feature including a cavity within a mating face provide on the housing, the standoff sized and dimensioned to fit the cavity in connection with self-alignment,
wherein the electronic accessory includes the processor, the wireless transceiver to receive streaming video, and the local storage to store program instructions to direct the processor to manage transfer of the streaming video to the electronic device through the accessory and device connectors.

7. The electronic assembly of claim 1, wherein the electronic device comprises a display presenting video content that is received by the electronic accessory and conveyed from the electronic accessory to the electronic device through the accessory and device connectors.

8. The electronic assembly of claim 6, wherein the body of the electronic accessory is directly mounted to an edge of the housing proximate to an extremity of the housing where the extremity is a top, bottom or side of the housing.

9. The electronic assembly of claim 6, wherein the electronic accessory includes a transmitter and the electronic device includes a receiver, the transmitter and receiver wirelessly conveying content there between in connection with communication between the electronic accessory and electronic device.

10. A method for self-aligning an electronic assembly with an electronic device, comprising:
providing an electronic device having a housing and one or more processors to manage operation of the electronic device, the one or more processors provided within the housing, the housing including a device alignment feature and device connector;
providing a self-aligning electronic accessory including a body that houses one or more of a processor, wireless transceiver, local storage, speakers, camera and infrared sensor, the body including an accessory alignment feature and accessory connector, the accessory alignment feature and accessory connector spaced and dimensioned apart from each other to align with the device alignment feature and device connector to directly mount and communicatively couple the accessory and electronic device;

utilizing magnetic coupling forces between accessory and device magnetic elements provided on the body and housing, respectively, to pull the body of the electronic accessory to a select self-alignment position with respect to the housing of the electronic device; and locating magnets, as the accessory and device magnetic elements, proximate to mating faces of the body and housing with the accessory magnetic element projecting outward from a mating face of the body by a distance greater than the device magnetic element.

11. The method of claim 10, further comprising sizing and dimensioning a standoff on a mating face of the body to fit a cavity within a mating face provide on the housing in connection with self-alignment.

12. The method of claim 10, further comprising facilitating the magnetic coupling by orienting magnets within the accessory alignment feature and housing alignment feature to have opposite polarities relative to one another.

13. The method of claim 10, further comprising locating the accessory connector within the accessory alignment feature and the device connector within the device alignment feature.

14. The method of claim 10, receiving video content at the electronic accessory and conveying the video content from the electronic accessory to the electronic device.

15. The method of claim 10, further comprising receiving streaming video at the electronic accessory and managing transfer of the streaming video to the electronic device.

* * * * *